April 14, 1959     H. L. MORRIS     2,881,928
PIPE LAYING AND TRANSPORTING DEVICE FOR BULLDOZERS
Filed Dec. 29, 1955     2 Sheets-Sheet 1
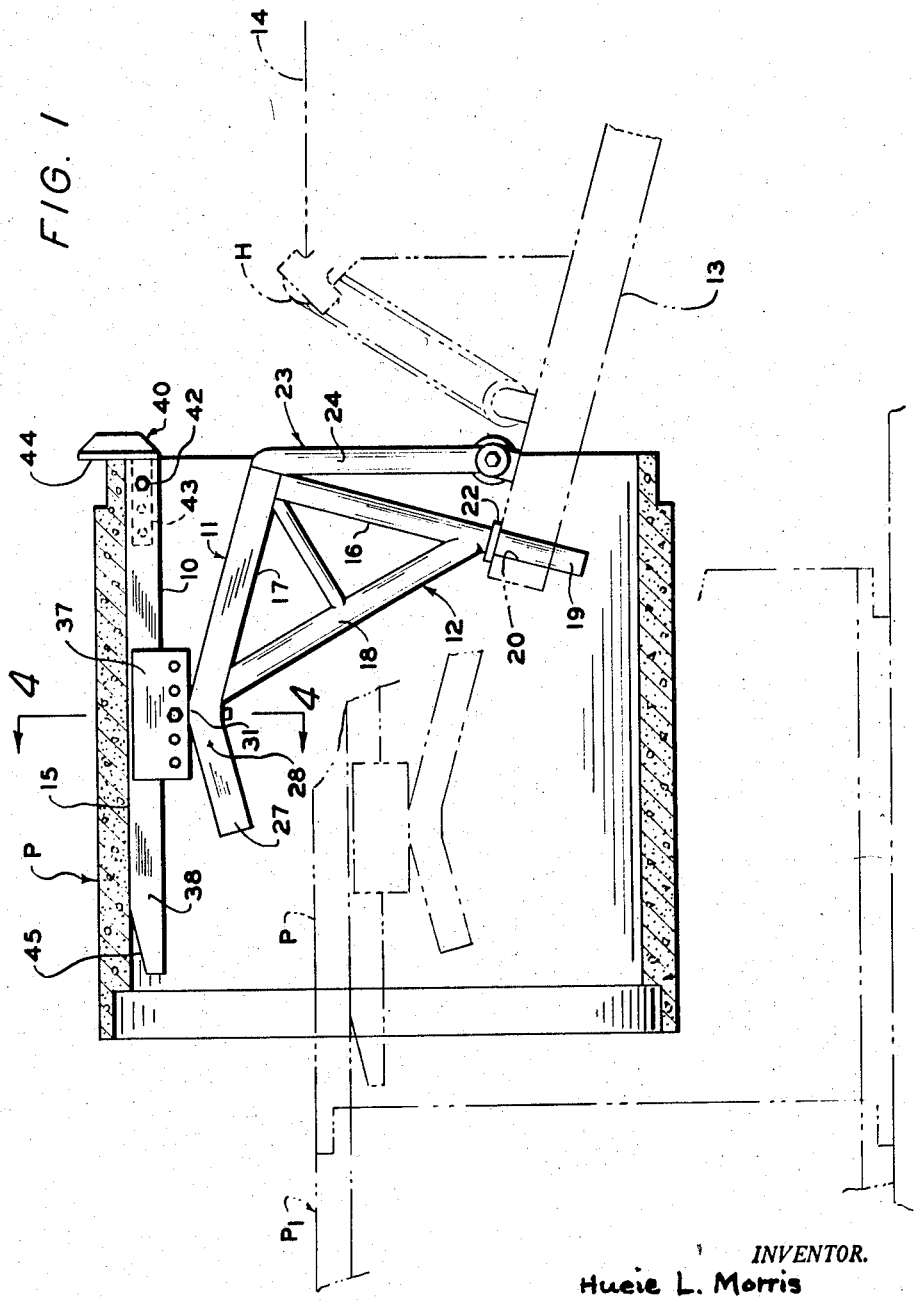
INVENTOR.
Huete L. Morris
BY
William Cleland
Attorney April 14, 1959  H. L. MORRIS  2,881,928
PIPE LAYING AND TRANSPORTING DEVICE FOR BULLDOZERS
Filed Dec. 29, 1955  2 Sheets-Sheet 2
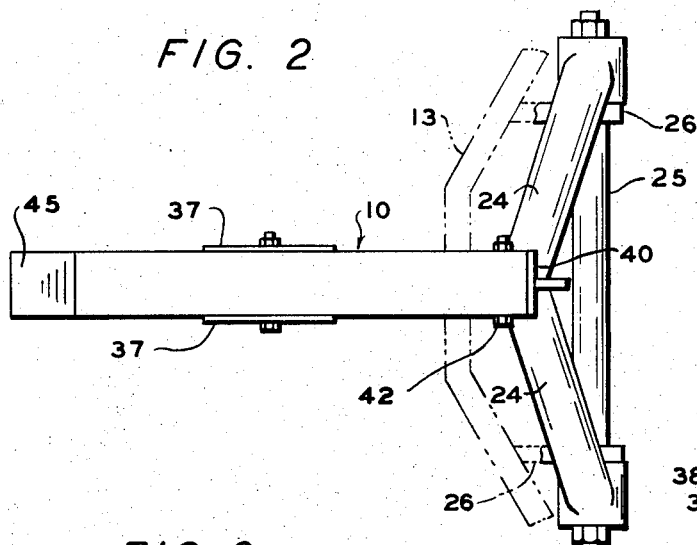
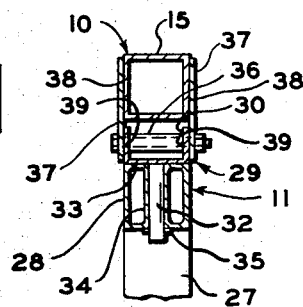
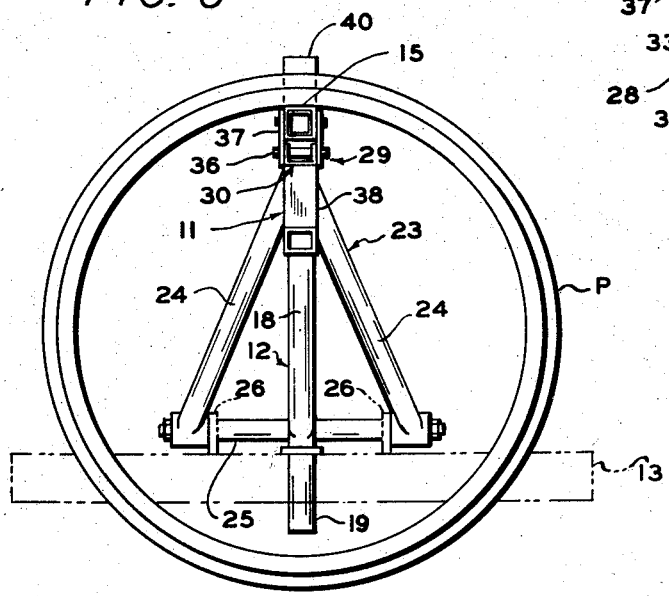
INVENTOR.
Huzie L. Morris
BY
William Cleland
Attorney United States Patent Office 2,881,928
Patented Apr. 14, 1959

2,881,928

PIPE LAYING AND TRANSPORTING DEVICE FOR BULLDOZERS

Hueie L. Morris, Cuyahoga Falls, Ohio

Application December 29, 1955, Serial No. 556,205

8 Claims. (Cl. 214—1)

This invention relates to a pipe section laying or transporting device, as for use on a bulldozer or other mobile unit having a movable support or lifting boom.

Heretofore, concrete conduits or pipe sections of relatively large diameters, for example, have been commonly lifted by movable supports or booms on bulldozers or the like by engaging a U-shaped lifting hook, on the end of a hoisting cable, over the edge of the pipe. This method, however, frequently resulted in breakage, due to leverage or crimping action applied to the brittle pipe section by the hook. Another well-known method involved wrapping or looping a chain around the wall of the pipe section, which also resulted in damage due to pressure of the chain at opposite end edges of the pipe section. Still another method involved provision of a hole in the pipe for attachment of an eyelet for engagement of a hook of a hoist cable, but this method also resulted in breakage due to the whole weight of the pipe being supported at the localized point of attachment of the eyelet to the pipe. Generally speaking, the prior art has failed to provide a suitable damage-proof pipe laying and transporting device, and particularly one which was readily adaptable for use on bulldozers, trucks and similar small conveyances.

One object of the invention is to provide a simple, economical to manufacture, pipe laying and transporting device, which is easily mounted on a lifting boom or movable support of a bulldozer or other existing mobile unit.

Another object of the invention is to provide a pipe laying device of the character described including a pipe-supporting cradle or holder which is self-operating to maintain the pipe section in level position in all angular positions of a movable arm portion supporting the cradle or holder.

Another object of the invention is to provide a device of the character described having improved means for varying the position of the pipe-supporting cradle to be self-leveling for different sizes of pipe sections.

Still another object of the invention is to provide a device of the character described, by use of which a bulldozer operator may lay or transport heavy pipe sections substantially unassisted, and without necessarily leaving the controls of the bulldozer or otherwise manually manipulating or handling the pipe sections.

Other objects of the invention will be manifest from the following brief description and the accompanying drawings.

Of the accompanying drawings:

Figure 1 is a side elevation of one embodiment of the improved pipe laying device with a pipe section, shown in cross-section, supported thereon, said device being mounted on a movable support of a bulldozer, as indicated in chain-dotted lines.

Figure 2 is a top plan view, on the same scale, of the pipe-laying device shown in Figure 1, but with the pipe section removed.

Figure 3 is an end elevation, on a reduced scale, as viewed from the left of Figure 1.

Figure 4 is a vertical cross-section taken substantially on the line 4—4 of Figure 1, on the same scale as Figure 1, and illustrating a universal connecting means between the pipe-supporting cradle and the supporting arm portion of the device.

Referring to the drawings generally the numeral 10 designates a pipe-supporting cradle, pivotally mounted to be substantially in self-balancing relation on a freely extending arm 11 of a rigid bracket member 12, which is carried by a vertically movable boom or support 13 of a bulldozer 14, for example. The cradle 10 may comprise an elongated hollow bar of rectangular cross-section, providing a generally flat upper surface 15 for supporting a pipe section P thereon in depending relation (see Figures 1 and 3).

The member 12, of which the arm 11 is a part, also includes a post 16 integrally connected to the inner end of the arm 11, at right angles to a straight inner portion 17 of the same, and also a suitable reinforcing brace 18 extending between said arm and said post. A downward extension 19 of said post is adapted to be received in a suitable bore 20 in the movable support or boom 13 to be supported on a collar 22 affixed to said extension. For preventing rotation of the bracket 12 on the boom 13, a yoke 23 affixed to the upper end of the member 12 may have downwardly and divergently extending legs 24, 24 which are releasably attachable to opposite ends of a rod 25, mounted between laterally spaced lugs 26, 26 provided on the boom 13 for that purpose. A free outer end extension 27 of arm 11 is shown formed with the straight inner portion 17 of the same to provide an inverted V-shaped portion 28 at the upwardly presented apex 31 of which may be a universal connecting means 29 for supporting the cradle 10 (see Figure 4).

Connecting means 29 may include a U-shaped bracket 30 having a stem 32 affixed to the web 33 thereof and rotatably received in a vertical sleeve 34 affixed in the arm portion 28. A suitable cotter pin 35 in the stem 32 prevents removal of the bracket from arm portion 28. Thus, the bracket 12 is adapted to rotate about a generally vertically extending axis. For pivoting the cradle about a horizontal axis, at right angles to said vertical axis, the cradle may have a rod 36 extending between spaced plates 37, 37 affixed to laterally opposite flat walls 38, 38 of the cradle, and also pivotally received through aligned apertures in the spaced upturned flanges 39, 39 of said rotatable U-shaped bracket 30.

The balancing position of the cradle on the connecting means 29 may be varied for balancing adjustment to pipe sections P of different lengths or sizes, as by provision of a series of longitudinally spaced and aligned apertures in the plates 37, for selective reception of the pivot rod 36. Additional or substitute balancing adjustment may be provided by provision of a stop member 40 longitudinally adjustably attached to the inner end of the cradle 10, as by a pin or bolt 42, selectively received through longitudinally spaced and aligned apertures in the opposite cradle walls 38, and through an aperture in a reduced extension 43 received in the hollow end of the cradle (see Figures 1 and 2). The stop means 40 includes a seat portion 44 at an angle to the top wall or seat 15 of the cradle, adapted to engage the corresponding end of the pipe section P, whereby pivot 36 is positively located with respect to the longitudinal center of the pipe section for supporting the same in self-levelling position on the cradle.

For facilitating initial insertion of the cradle within the pipe section P, the upper edge of the cradle, at the outer end of the same, may be chamfered as indicated at 45.

In use of the improved pipe-laying device, the bracket 12 is fixedly mounted on a pivoted yoke, or boom 13 of a bulldozer, for example, substantially as shown in Figure 1, and with the cradle 10 pivotally adjusted in position on the arm portion 28, at which it has been predetermined to support a given size of pipe P in self-levelling condition. Next, the yoke or boom 13 is lowered, by suitable power-operated hoisting means H, until the top face 15 of cradle 10 is slightly below the topmost edge of the inner periphery of the pipe section. When this position of the cradle is attained, the operator may move the bulldozer forwardly to insert the cradle inwardly of the pipe section until the seat portion 44 of stop means 40 engages the end of the same, while at the same time elevating the yoke or boom 13 to seat the pipe section on the cradle, as shown in Figures 1 and 4. In this way the pipe section may be carried by the bulldozer to desired location, at which the pipe section is lowered and then urged horizontally into desired connecting relation to a similar, previously laid, pipe section $P_1$ (see double dotted chain line position at left of Figure 1). In other words, with appropriate forward motion of the bulldozer, the stop means may be used for forcibly urging the pipe section P into horizontal connecting relation without damaging the same. Conversely, the cradle is removed from the pipe section P by simply backing the bulldozer away from it, there being no chains, hooks, or eyelets to remove as in the prior art devices. If necessary the operations may be assisted by turning the cradle 10 and pipe section P on the vertical axis through stem 32 of the connecting means 30.

Thus has been provided a simple, economical and efficient device for laying and transporting concrete pipe sections with a minimum of damage to the same.

Modifications of the invention may be resorted to without departing from the spirit thereof or the scope of the appended claims.

What is claimed is:

1. A pipe section laying device as for use on a relatively movable support of a vehicular contrivance, comprising a rigid member having a rigid forward extension presented freely forwardly of said support to be received freely within a said pipe section, means for attaching said member to said support, a cradle, and pivotal connecting means between said cradle and said extension whereby the cradle is pivotable on the arm portion about a generally horizontal axis which is transversely of a longitudinal axis of a pipe being laid, said cradle being gravitationally balanced at said horizontal axis to be self-levelling with a pipe section thereon in all positions of said extension with vertical movement of the support, stop means being provided on said cradle and engageable with an edge of a pipe section suspended on the cradle, said stop means being predeterminately positioned with respect to said horizontal axis for a given size of a said pipe section whereby the pipe section will be in self-levelling position when the stop means is in engagement with said edge of the pipe section.

2. A pipe section laying device as for use on a relatively movable support of a vehicular contrivance, comprising a rigid member having a rigid forward extension presented freely forwardly of said support to be received freely within a said pipe section, means for attaching said member to said support, a cradle, and pivotal connecting means between said cradle and said extension whereby the cradle is pivotable on the arm portion about a generally horizontal axis which is transversely of a longitudinal axis of a pipe being laid, said cradle being gravitationally balanced at said horizontal axis to be self-levelling with a pipe section thereon in all positions of said extension with vertical movement of the support, stop means being provided on said cradle and engageable with an edge of a pipe section suspended on the cradle, said stop means selectively shiftable to various positions longitudinally of the cradle to vary the position of said axis with respect to the longitudinal center of the pipe section.

3. A pipe section laying device as for use on a vertically movable support of a vehicular contrivance, comprising an upright, means for attaching said upright to said movable support, said upright having a rigid forward extension presented freely forwardly of said support to be received freely within a said pipe section, a cradle, and pivotal connecting means between said cradle and said extension whereby the cradle is pivotable on the extension about a generally horizontal axis which is transversely of a longitudinal axis of a pipe being laid, said cradle being gravitationally balanced at said horizontal axis to be self-levelling with a pipe section thereon in all positions of said extension with vertical movement of the support, stop means being provided on said cradle and engageable with an edge of a pipe section suspended on the cradle for determining the position in which the pipe will remain level with said cradle supporting the same.

4. A pipe section laying device as for use on a vertically movable support of a vehicular contrivance, comprising a lifting member, means for attaching said lifting member to said support to be vertically movable therewith, said lifting member having a rigid extension presented freely forwardly of said support to be freely received within a said pipe section from one end thereof, a cradle, means for pivotally attaching said cradle to said extension to be freely relatively swingable in a vertical plane about an axis transversely of said extension, adjacent portions of said extension and cradle being outwardly divergent at opposite sides of said axis to permit pivotal movement of said cradle to substantial angular extents in opposite directions in said vertical plane, said cradle thereby being gravitationally balanced on said extension at said axis to be self-levelling with a pipe section centered on the cradle within substantial range of vertical movements of said lifting member.

5. A pipe section laying device as set forth in claim 4, said pivotal attaching means including interengaging parts on said cradle and said extension, and a selectively variable means for variably interengaging said parts relatively of each other and thereby to vary the position of said cradle longitudinally with respect to said axis.

6. A pipe section laying device as set forth in claim 4, means being provided on said cradle for engagement with an end of the pipe section to limit the extent of insertion of the cradle within the pipe section at the point at which the same is in said self-levelling condition.

7. A pipe section laying device as set forth in claim 4, said pivotal attaching means including interengaging parts on said cradle and said extension, said parts being pivotally connected at said axis, and said part on said extension being connected thereto to rotate on the arm portion about an axis at an angle to said axis transversely of said extension.

8. A pipe section laying device as set forth in claim 4, stop means being provided on said cradle and engageable with an edge of a pipe section suspended on the cradle, said stop means being at the end of said cradle toward the point of attachment of said member to the relatively movable support, and the other end of said cradle being chamfered to facilitate insertion of the cradle to seated position within the uppermost portion of the pipe section.

References Cited in the file of this patent

UNITED STATES PATENTS 1,195,147     Mitchell _____ Aug. 15, 1916

FOREIGN PATENTS 928,638     Germany _____ June 6, 1955